Patented Aug. 1, 1933

1,920,728

UNITED STATES PATENT OFFICE 1,920,728

CELLULAR SLAG

Rothe Weigel, Wilmette, Ill., and Paul W. Bachman, Nashville, Tenn., assignors to Victor Chemical Works, Chicago, Ill., a Corporation of Illinois No Drawing. Application January 27, 1933
Serial No. 653,922

10 Claims. (Cl. 49—77.5)

This invention relates to cellular slag and more particularly to a cellular slag product having new and valuable characteristics.

It has been known for some time that molten slag could be treated to produce a porous or puffed product. The U. S. Patent 1,849,090 proposes to make a cellular product from blast furnace slags by direct treatment with finely divided water and annealing the product. This process and other known processes of puffing slag have been found not satisfactory in the treatment of slags produced in the smelting of phosphates, because of the tendencies of the processes to convert large amounts of the slag into granulated rather than cellular slag, and because the porous product is weakened by having large irregular voids scattered throughout the mass.

An object of the present invention is to provide an improved process for the treatment of slags by which granulation of the slags is avoided and by which a cellular product is obtained that has high crushing strength and is uniform in the sense that its cells do not exceed a certain predetermined size. The process is particularly advantageous in the treatment of phosphatic slags. The product is light in weight, has high sound and heat insulating properties, may be sawed and driven through with nails and the like without splitting. Specific advantages of the process and product will appear as the specification proceeds.

In the practice of our process, molten slag from a blast furnace, cupola, electric furnace, etc., used in the smelting of phosphates is drawn into a vessel until it is partially filled. The slag is then cooled to a temperature a little above the congealing temperature of the slag by means of gases such as air, steam, carbon dioxide, etc. We prefer to use steam varying from 40 to 120 pounds pressure as the cooling medium, introducing it into the body of the slag at or near the bottom of the slag containing vessel, the steam pressure being increased as the viscosity of the slag increases.

When the slag has been cooled to semi-congealing condition in the neighborhood of 1050 C. to 1200 C., water is preferably introduced uniformly throughout the bottom portion of the slag body and the amount of water (or other fluid which is capable of volatilizing and causing expansion of the slag body) is carefully controlled to bring about a uniform rate of agitation and a definite increase in volume of the mass. In the treatment of our slag the amount of water added cannot be proportionate to the slag temperature since we must cool to a congealing temperature before the direct addition of water, and then the water is added slowly until a definite crust is formed on the exterior of the mass. By introducing more or less water as the mass approaches the desired volume and as it gradually becomes viscous, the entire body is caused to be permeated with relatively small and uniformly dispersed pores or cells, which do not exceed certain sizes. When the cellular condition of the now viscous body is almost satisfactory, the exterior of the mass is set by quickly cooling. We prefer to cool by flooding the mass with water from beneath, after which the water is evaporated by the residual heat in the slag thus yielding a dry product. The sudden flooding with water and its subsequent evaporation causes large cracks to appear in the exterior layers of the mass and a further uniform expansion of the mass to take place, increasing the volume an additional 10 to 20%. The cell structure then becomes fixed and hard. The product, as determined by tests on pieces from several representative batches of phosphatic slag, showed the following approximate physical characteristics:

Apparent density_____ 0.80 to 1.10
Large cell diameter_____ 0.08 to 0.20''
Small cell diameter_____ 0.02 to 0.08''
Aprroximate percentage of small cells_____ 95%
Crushing strength_____ 750 to 1200 lbs. sq. inch.

Special advantages are found in the use of the process on phosphatic slags. The following analysis is typical of the phosphatic slags produced in the blast furnace process:

$P_2O_5$ _____ 2.60
$SiO_2$ _____ 37.50
CaO _____ 43.00
MgO _____ 0.80
$Fe_2O_3$ _____ 1.50
$Al_2O_3$ _____ 11.50
Sulphur _____ 0.60
Fluorine _____ 2.50

The combined effect of the low $Al_2O_3$, the high fluorine content, and the presence of $P_2O_5$, gives a slag with a wide span between the melting point and the free running temperature. This temperature range permits the slow congealing of the slag as its viscosity gradually increases on cooling. Such condition offers a distinct advantage in the formation of uniform sized cells in the porous mass without the necessity of critical control of the particle sizes of the water introduced. The slow formation of the cellular structure allows a more homogeneous and tougher skeleton structure which constitutes the cell walls, thus affording greater mechanical strength to cellular slag mass. Slags of the above general composition cannot be successfully treated with water directly as it leaves the furnace without the production of a large portion of granulated material. It is necessary therefore to use the two step process of first preparing the slag for the introduction of water or vaporizing liquid, by pre-cooling to the semi-congealing temperature with steam, air or inert gases, and secondly, after this congealing temperature is reached, to introduce water or vaporizing liquid to cause the uniform formation of cells throughout the mass.

Slags with $P_2O_5$ contents above 4% are also to be avoided because of their tendency to form too dense a mass with large irregular cells. Apparently the toughness or cohesive forces in this case are too great for the successful production of the cellular slag.

The final product is unusually strong for its weight because of its uniformity with respect to small cell structure and because it is unmixed with granulated slag, and because of the toughness due to its chemical composition. By first cooling the mass with steam or the equivalent to a temperature just above the congealing temperature and then by the second step of introducing the water, it is found that practically no granulation of the slag takes place, and that the added water uniformly distributes itself throughout the slag mass because of the tough yet soft nature of the phosphatic slag in its semi-congealed condition; also the formation of large bubbles is avoided.

Because of the regularity of the small cells in the product and the absence of large voids, the new cellular slag is a superior building material. It may be used for making light weight concrete aggregate which will permit the driving of nails into it and which can be cut or sawed into special shapes. It may be used alone or with asphalt emulsion as a road building material having excellent drainage qualities. The product forms insulating and sound-proofing blocks or boards and for this purpose, may be bonded with cement or the like. Such boards or blocks permit the application of plaster without the use of metal lath. The porous and sturdy character of the product adapts it for many other obvious uses.

An advantage of the two-step process described is that steam, which does not expand to any great extent, and which does not tend to produce granulation, is first introduced to bring about a cooling of the slag down to a point near its congealing temperature and then water, which expands greatly and which produces the desired expansion in the product, is introduced at a time when the contact of water with the slag does not tend to produce granulation.

While for the purpose of illustration, we have set forth the details of our preferred process, it will be understood that the steps may be varied widely in the practice of our invention. As, for example, while we prefer to use steam and water, as described, for the specific advantages obtained, other suitable cooling and cell-creating media, mechanical means of aeration, and the like may be employed in the operation of our process. Also, while the process has been illustrated in connection with phosphatic slags, it will be understood that the broad steps of the invention are applicable to other slags.

The foregoing detailed description has been given for clearness of understanding only, and no unnecessary limitations should be understood therefrom, but the appended claims should be construed as broadly as permissible, in view of the prior art.

We claim:

1. The method of treating slag for the purpose set forth, comprising maintaining a body of molten slag, cooling the body with steam to a temperature above the congealing temperature of the slag, and then introducing controlled amounts of water into the body of the slag to expand it to the desired volume.

2. The method of treating slag for the purpose set forth, comprising cooling a body of molten slag by the use of steam to a temperature slightly above the congealing temperature of the slag, and then introducing water into the body of the slag to expand it to the desired volume.

3. The method of treating slag for the purpose set forth, comprising cooling a body of molten slag by an agent in gaseous form to a point slightly above the congealing temperature of the slag, and then introducing water into the body of the slag to expand it to the desired volume.

4. The method of treating slag for the purpose set forth, comprising cooling a body of molten slag by an agent in gaseous form to a point slightly above the congealing temperature of the slag, introducing water into the body of the slag to expand it to the desired volume, and then quickly cooling the mass.

5. The method of treating slag for the purpose set forth, comprising cooling a body of molten slag by an agent in gaseous form to a temperature above the congealing temperature of the slag, introducing water in the body of the slag to expand it to the desired volume, and then flooding the mass with water.

6. The method of treating phosphatic slag for the purpose set forth, comprising first introducing a cooling medium in gaseous form into a body of molten slag to cool it to a temperature slightly above the congealing temperature of the slag, and then introducing water into the slag body to expand it to the desired volume.

7. The method of treating phosphatic slag for the purpose set forth, comprising introducing steam into a body of molten slag to cool it to a temperature slightly above the congealing temperature of the slag, introducing water into the slag body to expand it to the desired volume, and then quickly cooling the mass.

8. The method of treating phosphatic slag for the purpose set forth, comprising introducing steam into a body of molten slag to cool it to a temperature slightly above the congealing temperature of the slag, introducing water into the slag body to expand it to the desired volume, and then flooding the mass with water to cause additional expansion.

9. The method of treating phosphate slag for the purpose set forth, comprising maintaining a body of molten slag containing .5% to 4.0% of $P_2O_5$, 13% or less of $Al_2O_3$, 0.5% or more of fluorine, cooling with steam to from 1050 C. to 1250 C., introducing water to expand the mass to the desired volume, and then flooding the mass with water to cause additional expansion and setting.

10. The method of treating phosphate slag, comprising maintaining a body of molten slag having a $P_2O_5$ content less than 4%, cooling with steam to from 1050 C. to 1250 C., and introducing water to expand the mass to the desired volume.

ROTHE WEIGEL.
PAUL W. BACHMAN.